Sept. 8, 1959 O. HEIGL ET AL 2,902,795
METHOD OF PREPARING PLANTS FOR PLANTING AND HARVESTING
Filed April 17, 1956

INVENTORS:
Otto Heigl & Günter Stannagel
by MESTERN & FREY

2,902,795
METHOD OF PREPARING PLANTS FOR PLANTING AND HARVESTING

Otto Heigl, Post Mangolding, Oberpfalz, and Günther Scharnagl, Regensburg, Germany Application April 17, 1956, Serial No. 578,769

Claims priority, application Germany April 19, 1955

5 Claims. (Cl. 47—58)

The present invention represents a new significant, simplifying and therefore economical method for lifting plants especially bulbous or tuberous plants from the soil, for harvesting, crop, transplanting, wintering etc. Bulbous plants such as tulips or gladioli lose their leaves and stems in autumn which makes the bulbs invisible and difficulties arise in finding them when they are to be taken out from the soil for keeping them through the winter. Tuberous plants such as potatoes must be lifted mostly with spades and gathered by laborers. A special soil only, which can be sieved, allows the use of an uprooting machine but even then the gathering of the potatoes by laborers will remain.

The method for planting plants with earth adhering to the roots has proved highly profitable as the earth adhering to the roots remains undestroyed when the plant is inserted into the earth or when transplanted.

The new invention described herein, shows a method for planting or harvesting all the these various plants which make it possible to find the bulbs in the earth easily and lift them from the soil without damage. According to the invention the plants or their underground parts, such as roots with earth adhering thereto, bulbs, tubers etc. are wrapped in an envelope the walls of which being provided with little holes or perforations, and inserted into the soil preferably in such a manner, that the upper open rim of the envelope projects from the soil. This envelope wrapping the lower and side part of the roots or the bulb of a plant like a bag having sufficient capacity to expand with the growth of the roots or bulb, has an opening in its projecting part, so that the trunk or stem or the leaves can grow through this opening. The thin roots only, can grow through the fine perforations in the walls of the envelope and root into the soil. Owing to the sufficient capacity of this envelope the underground part of the plant is not prevented from growing and expanding nor stopped in its development.

Bulbous or tuberous plants can be advantageously planted with their bulbs wrapped in the envelope according to the invention the upper projecting rim of the bag being provided with a handle for lifting the bag easily from the earth.

Plants with roots can be lifted from the soil and inserted into another planting place without any damage when wrapped in the envelope according to the invention. Even cultivating plants can be left in these envelopes for three or four years and be inserted in the cultivation area together with them.

The new method can be adapted with preference for potatoes. It saves the expensive digging and gathering of the crop. Potato tubers wrapped in the envelope according to the invention set further tubers in the ordinary way remaining and expanding in the bag according to its capacity by pressing the walls of the bag sideways. The roots only grow through the holes of the envelope into the soil. The potatoes can be harvested by lifting the full bags from the soil, and transporting them saving time and laborers for picking up each potato. A further advantage by lifting all potatoes of one plant in the envelope according to the invention is that the soil must not unnecessarily be dug up. Moreover, it is impossible to leave any potatoes in the earth.

The envelope according to the invention may consist of foil of synthetic materials or plastics or of fabric knitted or woven of synthetic threads. The diameter of the perforations in the walls of the envelope corresponds with the diameter of the roots of the plant. It is essential to choose a material for the envelope resistant against tearing and rotting.

Each plant may be provided with one bag or enveloped in a cloth folded round the roots or the bulb before inserting into the soil. For plants set in rows, such as potatoes, continuous ribbons or strips may serve as envelopes, which are provided with seed potatoes spaced in the required distance. Each ribbon or strip is broad so as to be folded when laid into the earth. From this folding the ribbon or strip gains a great capacity, to give each potato sufficient room to grow and expand.

The ribbon or strip can be conveniently inserted by means of a machine into the earth and provided with potatoes at certain distances.

Referring to the drawing.

The tulip bulb 1 is wrapped in an envelope 2 provided with a great number of fine holes or perforations for admitting the roots to pass and grow into the earth, and set thus into the earth the open part of the envelope with its rim 2' projecting upwards from the earth. Bulbs are preferably enveloped in ready made bags. The bulb puts forth upwards stem and leaves through the upper open rim of the bag. The subterranean roots grow through the fine perforations of the bag 2 and root into the soil. According to its capacity the envelope 2 gives way to the growing and developing bulb which pushes the walls of the bag outwards. As the walls of the bag yield without additional force the bulb is never prevented from normal growth. There are the same conditions with all kinds of bulbous or tuberous plants. For example, celery, beet roots, sugar beets etc. may also be planted in a bag-shaped envelope into the earth. The subterranean part of a plant can be lifted from the earth by means of the projecting rim 2' of the bag which indicates the place where the plant had been planted.

Figure 1:
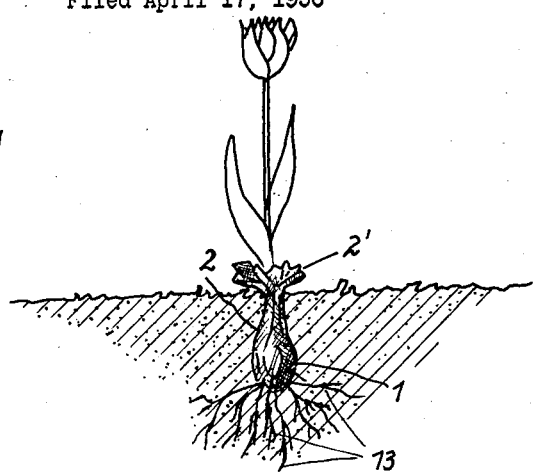
Fig. 1 shows a tulip in vertical section the bulb of which is inserted into the earth in a bag.
Figure 2:
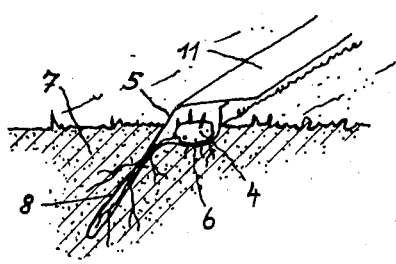
Figs. 2–4 show a potato embedded in the earth on a strip of synthetic material or plastics, in three periods of growth.
Figure 3:
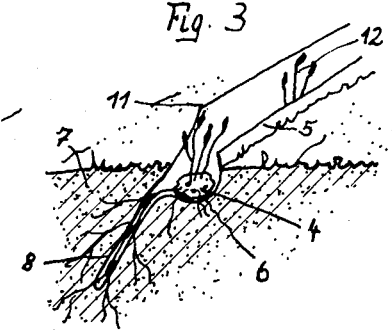
Figure 4:
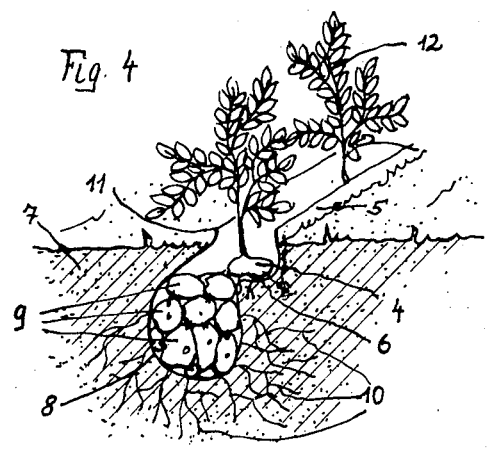

Figs. 2–4 show a seed potato or tuber wrapped in an envelope and inserted into the earth. This envelope may consist either of a bag or of a cloth or preferably of a continuous ribbon or strip 5 of a larger length, as indicated in the drawing. This envelope is provided with a great number of little holes or perforations. The continuous ribbon or strip 5 is preferably inserted thus into the earth as to form a flat mould 6 for receiving seed potatoes 7 in certain distances along its length, and connected with the mould are one or more folded parts 8 of the strip extending into the earth giving room for the growth of new potatoes 9. The roots 10 grow through the fine holes of the envelope into the earth. The new potato tubers 9 press against the walls of the envelope in the soil 7, which, owing to its capacity yields without force to the increasing size of the subterranean parts of the plant. A rim 11 projecting from the earth turned down for covering the tuber can advantageously be used for protecting the potatoes 4 against frost. The potato stalks 12 grow upward pressing the rim 11 aside. The potato crop can be highly simplified by pulling the envelope containing the potatoes out of the earth the soil being broken up slightly from the sides to relieve the stress of the pull.

The envelope may consist either of a foil of synthetic materials or plastics, or in general of synthetic materials or plastics. A foil of synthetic materials, for example, provided with a great number of fine holes or perforations, or fabric threads of synthetic materials, such as Perlon or nylon may be used, the latter being produced by weaving or knitting. A wire net-work of corresponding fineness may be used too as envelope. It is essential to use an envelope of non-decaying material and of a strength which resists humidity, heat and frost and any stress caused by expanding of the underground parts of the plant or by pulling the same from the soil.

We claim:

1. A method of preparing plants for both planting and harvesting which comprises wrapping the subterranean parts of said plants in an envelope which is made of a synthetic plastic foil having rot-resistant and non-decaying properties and being elastic so as to expand upon growth of said subterranean parts without inhibiting such growth, and having a plurality of circular perforations of a diameter just large enough to permit the roots of said plants to penetrate said envelope; and inserting said envelopes containing said plants in the soil.

2. A method according to claim 1, in which the upper open rim of the envelope projects from the soil.

3. A method according to claim 1, in which each plant is provided with one envelope.

4. A method according to claim 1, in which for plants in a spaced row a continuous strip or ribbon as envelope is used.

5. A method according to claim 1, in which the plant together with the envelope is lifted from the soil during the harvesting.

References Cited in the file of this patent

UNITED STATES PATENTS

| | | |
|---|---|---|
| 614,002 | Jenkins | Nov. 8, 1898 |
| 1,634,727 | Roy | July 5, 1927 |
| 1,750,054 | Rosso | Mar. 11, 1930 |
| 1,936,988 | Otwell | Nov. 28, 1933 |
| 1,994,553 | Wolcott | Mar. 19, 1935 |
| 2,083,065 | Heyl | June 8, 1937 |
| 2,113,523 | White | Apr. 5, 1938 |
| 2,252,073 | Gray | Aug. 12, 1941 |
| 2,252,554 | Carothers | Aug. 12, 1941 |
| 2,264,973 | Guarino | Dec. 2, 1941 |
| 2,394,192 | Mann | Feb. 5, 1946 |
| 2,571,491 | Schindler | Oct. 16, 1951 |
| 2,602,482 | Lyon | July 8, 1952 |
| 2,605,589 | Kuestner | Aug. 5, 1952 |
| 2,704,099 | Wikle | Mar. 15, 1955 |

FOREIGN PATENTS

| | | |
|---|---|---|
| 74,703 | Austria | Sept. 25, 1918 |

OTHER REFERENCES

Hackh's Chemical Dictionary, third edition, published 1944 by Blakiston (Phila.), page 587.